(12) United States Patent
Clement et al.

(10) Patent No.: US 8,320,860 B1
(45) Date of Patent: *Nov. 27, 2012

(54) CLEAN SPOT DETECTION FOR FM TRANSMISSION

(75) Inventors: Patrick Clement, Belmont (CH); Lydi Smaini, Lausanne (CH); Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,460

(22) Filed: May 27, 2011

Related U.S. Application Data

(63) Continuation of application No. 11/970,443, filed on Jan. 7, 2008, now Pat. No. 7,953,382.

(60) Provisional application No. 60/883,581, filed on Jan. 5, 2007.

(51) Int. Cl.
*H04B 7/08* (2006.01)

(52) U.S. Cl. .......... 455/140; 455/145; 455/62; 455/450; 455/454; 455/352

(58) Field of Classification Search .................. 455/140, 455/145, 62, 450, 454, 352
See application file for complete search history.

(56) References Cited

U.S. PATENT DOCUMENTS

| 6,131,038 | A | 10/2000 | Sekine | |
|---|---|---|---|---|
| 7,953,382 | B1* | 5/2011 | Clement et al. | 455/140 |
| 2003/0036357 | A1 | 2/2003 | McGowan | |
| 2006/0293007 | A1 | 12/2006 | Kim | |

OTHER PUBLICATIONS

Information technology—Telecommunications and information exchange between systems—Local and metropolitan area networks—Specific requirements—Part 11: Wireless LAN Medium Access Control (MAC) and Physical Layer (PHY) specifications, Aug. 20, 1999, pp. 1-531. ISO/IEC 8802-11. The Institute of Electrical and Electronic Engineers, Inc., New York, NY.

Draft Standard for Information Technology—Telecommunications and information exchange between systems—Local and metropolitan area networks—Specific requirements—Part 11: Wireless LAN Medium Access Control (MAC) and Physical Layer (PHY) specifications—Amendment: Radio Resource Measurement, Jan. 2007, pp. 1-194, IEEE Computer Society, New York, NY.

\* cited by examiner

*Primary Examiner* — Sanh Phu

(57) ABSTRACT

Methods and apparatuses for quiet spot detection for radio frequency transmission thereon. According to various embodiments, a device may include a local receiver configured to evaluate one or more frequencies of a frequency band to determine a quiet spot frequency, the device further including a local transmitter configured to transmit signals at the quiet spot frequency.

18 Claims, 5 Drawing Sheets

CLEAN SPOT DETECTION FOR FM TRANSMISSION

CROSS REFERENCE TO RELATED APPLICATIONS

This application is a continuation of U.S. application Ser. No. 11/970,443 (now U.S. Pat. No. 7,953,382), filed on Jan. 7, 2008, which claims priority under 35 U.S.C. §119(e) to U.S. Provisional Application No. 60/883,581, filed on Jan. 5, 2007.

TECHNICAL FIELD

Embodiments of the present invention relate generally to audio transmitter and receivers, and more particularly, to devices including both a transmitter and a receiver.

BACKGROUND

Portable electronic devices, such as digital audio players, mobile telephones, and the like, have become increasingly popular. These devices generally require a user to hold the device to their ear either directly or indirectly by way of earphones or a headset. Although these devices perform well for a single user, users sometimes find that amplifying the sound for either multiple listeners or for "hands-free" use is desired.

Radio transmitters transmit audio signals from a device, such as a portable electronic device, to be detected by a remote radio receiver. In general, a transmitter is programmed to be switched between a few pre-determined channels, the user selecting one of the channels for transmitting the audio signals. The use of a transmitter may require a user to manually locate the available channels on a radio band to determine which channel is sufficiently quiet for transmitting the audio signals. The user generally determines which of the channels is quiet simply by listening directly to the quality of signals on the available channels. Once the user has identified a quiet spot, the user may need to switch the transmitter to the selected channel and enable the electronic device. After starting up or enabling the electronic device, the user then may be able to transmit audio signals from the device to the remote radio receiver.

In some cases, a quiet spot on a radio band may become non-quiet. Sometimes this may be due to movement of the remote radio receiver, which may cause a quiet spot to become closer to a location of a transmitter of a radio station which broadcasts on the particular frequency of the selected quiet spot. For example, a user may use a transmitter in a vehicle to play music from a digital audio player. While driving, the music may be interrupted by a radio station broadcasting on the same frequency of the quiet spot. This may be due to the radio station's signal becoming stronger as the user has driven closer to the source of the radio station's signal. Resultantly, the user must repeat the process for finding another quiet spot. In some larger urban areas, the user may encounter extreme difficulties in locating and/or maintaining a quiet spot. In addition to the possible dangers of requiring the user to repeatedly locate quiet spots while driving, frustration may lead the user to forego use of the transmitter altogether.

SUMMARY OF THE INVENTION

In view of the challenges in the state of the art, embodiments of the present invention are directed to methods and apparatuses for quiet spot detection for radio frequency transmission. More specifically, there is provided, in accordance with various embodiments of the present invention, a local receiver configured to evaluate one or more frequencies of a frequency band to determine a quiet spot frequency, and a local transmitter configured to transmit signals at the quiet spot frequency.

In various embodiments, the local receiver may be configured to store an indicator of the quiet spot frequency on a memory device.

In various embodiments, the local receiver may be configured to determine the quiet spot frequency based at least in part on signal strengths of the one or more frequencies. In various ones of these embodiments, the quiet spot frequency may have a signal strength lower than one or more other frequencies of the frequency band. In some embodiments, a received signal strength indicator may be configured to determine the quiet spot frequency according to an IEEE 802.11 standard.

In various embodiments, the local receiver may be configured to re-evaluate the quiet spot frequency to determine if the quiet spot frequency has become non-quiet. For some of these embodiments, the local receiver may be configured to re-evaluate the one or more frequencies to determine another quiet spot frequency if the evaluated quiet spot frequency is non-quiet. In some embodiments, the local receiver may be configured to re-evaluate the quiet spot frequency upon powering up of the device.

In various embodiments, the local transmitter may be configured to transmit signals to a remote sound producing arrangement for demodulation of the signals.

In various embodiments, a control unit may be provided for tuning remote sound producing arrangement to the quiet spot frequency.

In various embodiments, a display may be provided for displaying the indicator of the quiet spot.

There is also provided, in accordance with various embodiments of the present invention, a device for quiet spot detection for radio frequency transmission that may comprise means for evaluating one or more frequencies of a frequency band to determine a quiet spot frequency; and means for transmitting signals at the quiet spot frequency.

In various embodiments, the means for evaluating the one or more frequencies may comprise means for evaluating the one or more frequencies based at least in part on signal strengths of the one or more frequencies. In various embodiments, the quiet spot frequency may have a signal strength lower than one or more other frequencies of the frequency band. In some embodiments, the means for evaluating the one or more frequencies may comprise means for re-evaluating the quiet spot frequency to determine if the quiet spot frequency has become non-quiet. In some embodiments, the means for evaluating the one or more frequencies may comprise a means for re-evaluating the one or more frequencies to determine another quiet spot frequency if the evaluated quiet spot frequency is non-quiet.

In various embodiments, the device may be a wireless handheld device or a digital audio player.

A method for quiet spot detection for radio frequency transmission is also described. According to various embodiments, the method comprises evaluating one or more frequencies of a frequency band to determine a quiet spot frequency; storing an indicator of the quiet spot frequency; receiving or retrieving the indicator; and using the indicator to transmit signals on the quiet spot frequency.

In various embodiments, the quiet spot frequency may be determined based at least in part on signal strengths of the one or more frequencies. The signal strengths of the one or more frequencies may be determined according to an IEEE 802.11 standard.

In various embodiments, the method may comprise re-evaluating the quiet spot frequency to determine if the quiet spot frequency has become non-quiet. In various ones of these embodiments, the method may further comprise re-evaluating the one or more frequencies to determine another quiet spot frequency if the evaluated quiet spot frequency is non-quiet.

Other features that are considered as characteristic for various embodiments of the present invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous.

The phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

The terms chip, die, integrated circuit, monolithic device, semiconductor device, and microelectronic device are often used interchangeably in the microelectronics field. The present invention is applicable to all of the above as they are generally understood in the field.

The terms "remote" and "local" as used herein may not necessarily refer to locations of the referred-to features but they may, depending on the context.

Embodiments of the present invention are directed to methods and apparatuses for quiet spot detection for radio frequency transmission. According to various embodiments, a device may include a receiver configured to scan a radio frequency band to detect one or more quiet spots; the device can further include a transmitter configured to tune the device to one of the detected quiet spots. In some embodiments, the device may be configured to convert digital data stored on the device to analog signals, and the analog signals can then be detected by a remote sound producing arrangement such as, for example, a receiver of a remote radio, television, or other device suitable for the purpose. Accordingly, the disclosed methods and apparatuses may obviate the need for the user to manually scan the radio frequency band to determine the frequency of a quiet spot and then manually tune the radio frequency transmitter to the quiet spot frequency for transmitting data to a remote device.

Figure 1:
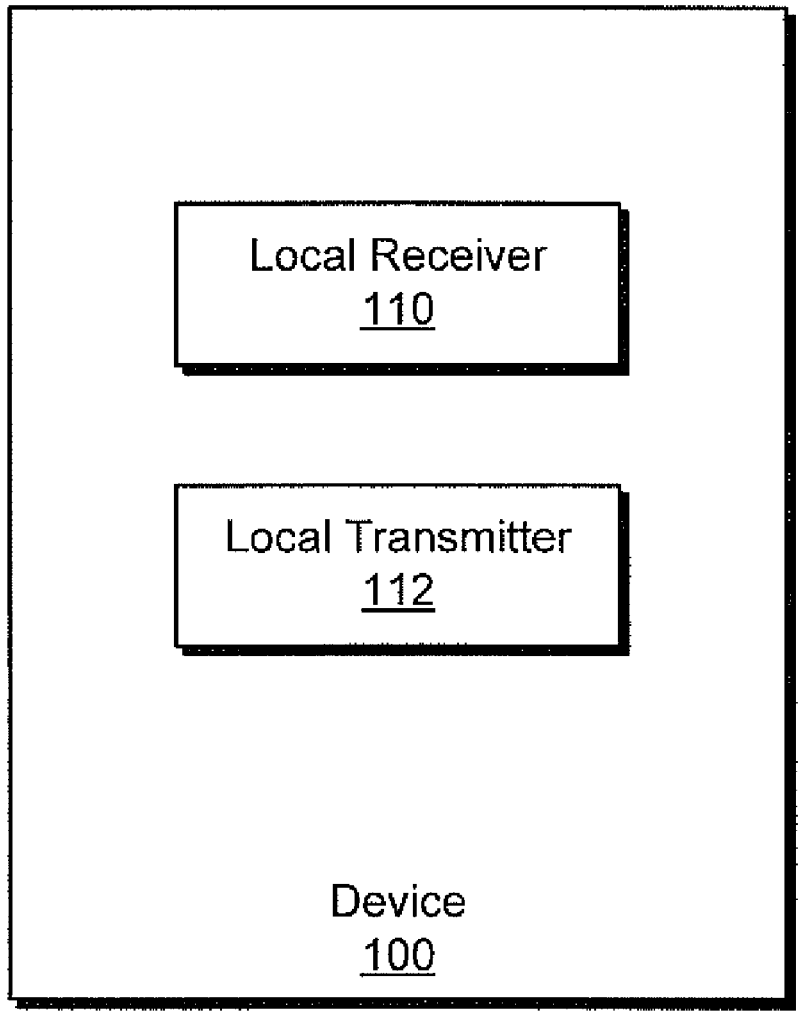
FIG. 1 is a block diagram of a device for quiet spot detection and transmission, in accordance with various embodiments of the present invention.

Illustrated in FIG. 1 is an exemplary embodiment of a device 100 for quiet spot detection for radio frequency transmission. According to various embodiments, device 100 may be configured to scan a radio frequency band to detect one or more quiet spots and transmit signals at one of the detected quiet spots.

Device 100 may comprise a local receiver 110 configured to receive or otherwise detect signals on one or more radio communication frequencies. For example, local receiver 110 may be configured to scan a selected one or both of the frequency modulation (FM) band and the amplitude modulation (AM) band. The FM band may, however, be preferred for many applications such as, for example, for transmitting music, due the generally known fidelity difference between the bands.

As used herein, "quiet spot," as is generally known in the art, may refer to a frequency of a radio frequency band having a signal strength lower than one or more other frequencies. It is sometimes known in the art to alternatively refer to such a frequency as a "clean spot." Determining whether a frequency is considered a quiet spot may be achieved using any method suitable for the purpose. For example, according to various embodiments, whether a frequency is considered a quiet spot may be determined based at least in part on a predetermined threshold signal strength such that a frequency having a signal strength below the predetermined threshold may be considered a quiet spot. In various embodiments, whether a frequency is considered a quiet spot may be determined based at least in part on relative signal strengths among two or more frequencies such that a frequency may be considered a quiet spot if the frequency has a signal strength lower than that of at least one other frequency. A wide variety of alternate and/or equivalent embodiments or implementations calculated to determine whether a frequency is a quiet spot may be substituted for the embodiments shown and described without departing from the scope of the present invention.

Signal strength may be determined according to any method suitable for doing so. For example, signal strength may be determined according to an Institute of Electrical and Electronics Engineers (IEEE) wireless standard, e.g., the 802.11-2007 standards along with any revisions, amendments or updates thereto. For example, the proposed 802.11k standards for Received Signal Strength Indication (RSSI) may be used for determining signal strength.

For determining signal strength, device 100 may include a received signal strength indicator (not illustrated) adapted for evaluating signal strength of signals detected by local receiver 110. A received signal strength indicator may be formed on the same chip as local receiver 110, or may be a separate chip of device 100.

Device 100 further comprises a local transmitter 112. Local transmitter 112 may be configured to transmit signals at one of the quiet spots detected and amplified by local receiver 110. In various embodiments, quiet spots may be detected by a sound producing arrangement (e.g., a remote device such as a receiver of a remote radio, television, or other device suitable for the purpose). According to various embodiments, local receiver 110 and local transmitter 112 may be integrated on a single chip. Accordingly, the size of device 100 may be minimally impacted, if at all, by inclusion of both local transmitter 112 and local receiver 110 into device 100. In some applications, however, local receiver 110 and local transmitter 112 may instead be formed on separate chips and then integrated into device 100.

Figure 2:
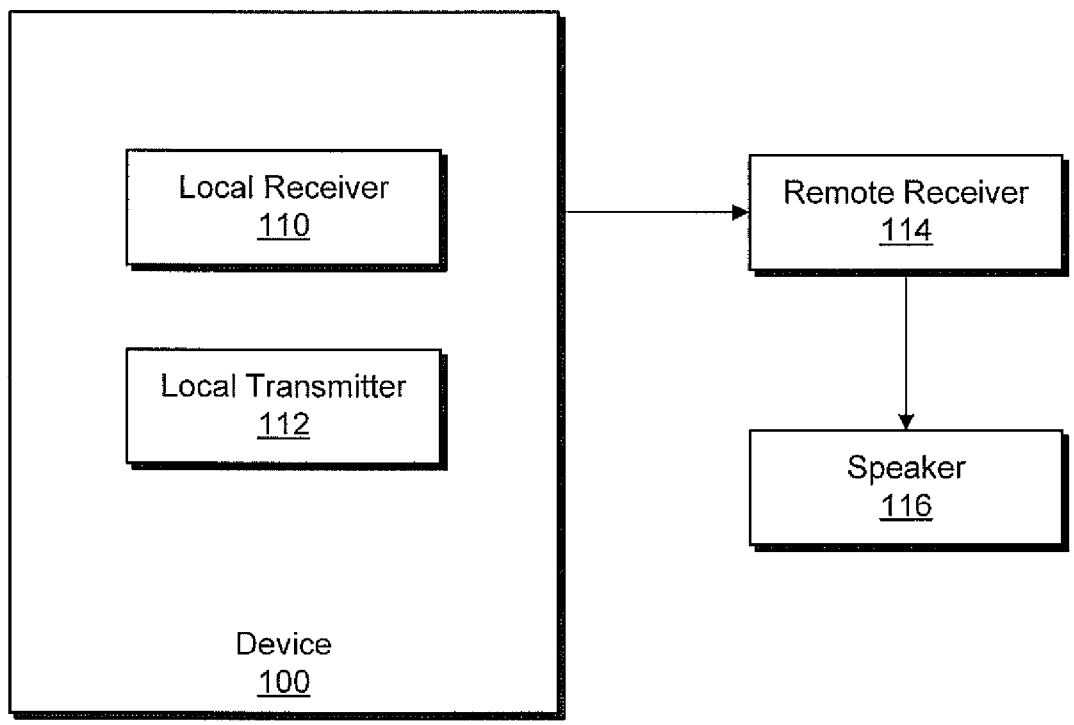
FIG. 2 is a block diagram of a system incorporating the device of FIG. 1, in accordance with various embodiments of the present invention.

Illustrated in FIG. 2 is an exemplary system incorporating device 100. As illustrated, signals transmitted by device 100 may be detected by a sound producing arrangement including a remote receiver 114 and one or more speakers 116. Remote receiver 114 may be configured to convert the transmitted signals into sounds projected by one or more speakers 116. Remote receiver 114 may be any one of such receivers typically found in vehicles, but may generally be any remote receiver suitable for the purpose. For example, remote receiver 114 may be any portable or non-portable radio receiver. Remote receiver 114 may comprise one or more of a tuner, a demodulator, and an amplifier for detecting, demodulating, and/or amplifying signals as desired.

Device 100 may be any one of various portable electronic devices. In accordance with various embodiments, device 100 may be any device configured to transmit analog audio signals based at least in part on digital data stored on a memory device of or otherwise received by device 100. For example, device 100 may be an audio player configured to transmit analog audio signals based on digital data stored on a compact disc or the like.

In accordance with various embodiments, device 100 may be a digital audio player. Device 100 may include solid state memory or the like, configured to store digital data representative of some audio recording, which device 100 may then transmit as analog audio signals bearing substantial similarity to the recording. For example, digital data may be a compressed or otherwise encoded digital data file, which when decompressed or otherwise decoded may be output as analog audio signals. In various ones of these embodiments, the digital data may be compressed/decompressed using any suitable algorithm such as, for example, a Moving Picture Experts Group (MPEG) standard (e.g., MPEG layer 3 (MP3)), Advanced Audio Coding (AAC), Windows Media Audio (WMA), Waveform Audio (WAV), and the like.

In accordance with various embodiments, device 100 may be a wireless handheld device or the like. A wireless handheld device may be any one of various mobile devices such as, for example, a mobile telephone, a personal digital assistant, or a smartphone. In various embodiments, local receiver 110 may receive or otherwise detect signals on one or more radio communication frequencies to determine a quiet spot, and local transmitter 112 may transmit signals of voice, music, or other sounds at the frequency of the quiet spot to remote receiver 114 for amplification by way of one or more speakers 116. For example, device 100 may be used in an automobile to allow a user to operate device 100 in a hands-free mode by amplifying the received audio signals over the automobile's speakers. This application may be particularly useful in situations wherein device 100 is not configured to transmit such signals by way of a personal area network (using the Bluetooth™ specification, for example).

In various embodiments, local receiver 110 may be configured to store at least one indicator of at least one frequency of the band. The indicator may be, for example, a particular frequency value (e.g., 94.7 MHz). In various embodiments, local receiver 110 may be configured to store an indicator based at least in part on a signal strength at the frequency. So, for example, if local receiver 110 scans the band searching for one or more quiet spots thereon, local receiver 110 may store, at least temporarily, the frequency value(s) of detected quiet spot(s).

Figure 3:
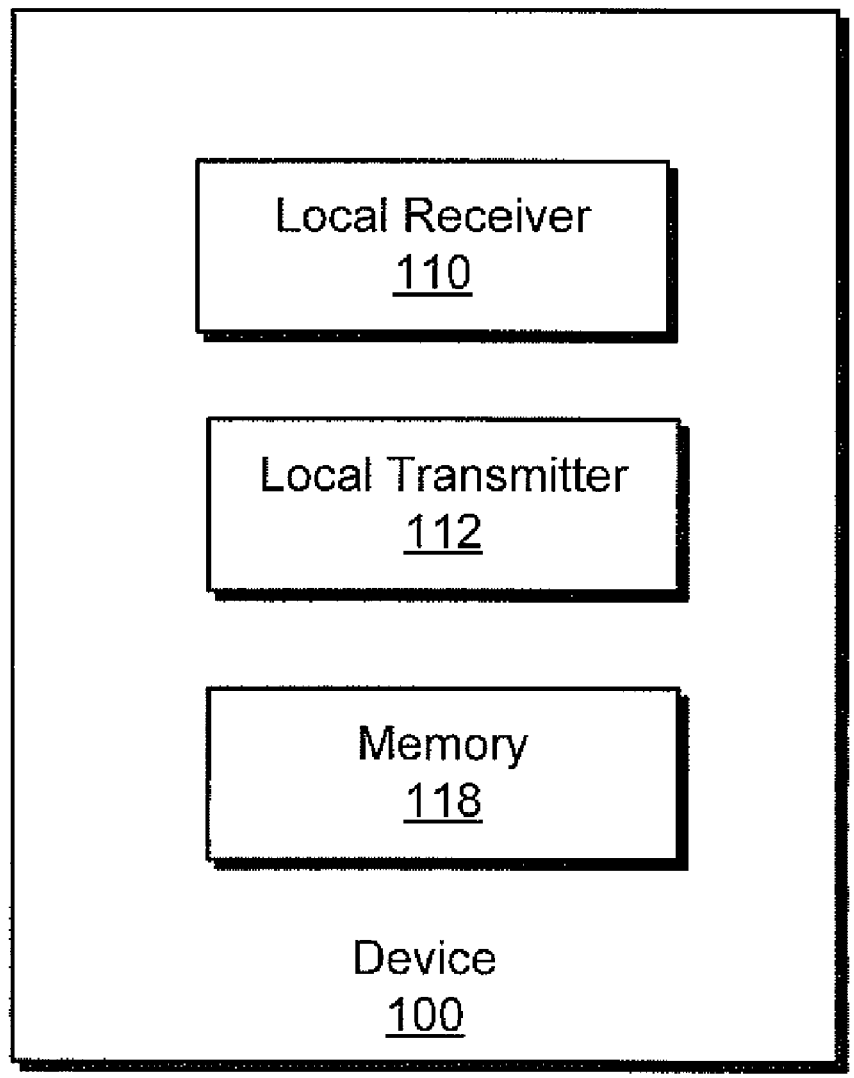
FIG. 3 is a block diagram of another embodiment of a device for quiet spot detection and transmission, in accordance with various embodiments of the present invention.

As illustrated in FIG. 3, device 100 may include memory 118 or similar data storage means for storing one or more indicators of one or more frequencies. In these embodiments, local receiver 110 may be configured to scan at least a portion of the frequency band to locate one or more quiet spots and then transfer to memory 118, or otherwise make available for retrieving, indicator(s) of the detected quiet spot(s).

Memory 118 may comprise any data storage device for storing data at least temporarily. In various embodiments, memory 118 may be the same element of device 110 for storing audio data or may be a different storage element. Memory 118 may be a volatile memory device or a non-volatile memory device. Memory 118 may be a fully integrated memory device or may be a removeable memory device (e.g., a USB flash drive or the like).

Local transmitter 112 may be configured to receive or retrieve an indicator of at least one frequency of a frequency band. For example, local transmitter 112 may be configured to receive or retrieve the indicator of at least one frequency either directly from local receiver 110 or from one or more other components of device 100, such as, for example, from memory 118. In some embodiments, upon receiving or retrieving an indicator of a frequency, local transmitter 112 may transmit signals at the received or retrieved frequency. The signals transmitted by local transmitter 112 may be modulated analog signals carrying information such as, for example, music or other sound.

In some embodiments, after device 100 has determined a location of a quiet spot, a user may tune device 100 to the frequency of the quiet spot. Additionally or alternatively, device 100 may be configured to automatically tune device 100 to the frequency of the quiet spot. As used herein, "automatically" may refer to requiring no or limited action on the part of the user for causing the tuning to occur. So, in these embodiments, only limited interaction, if any, by the user may be required for transmitting data from device 100 to a remote device.

Figure 4:
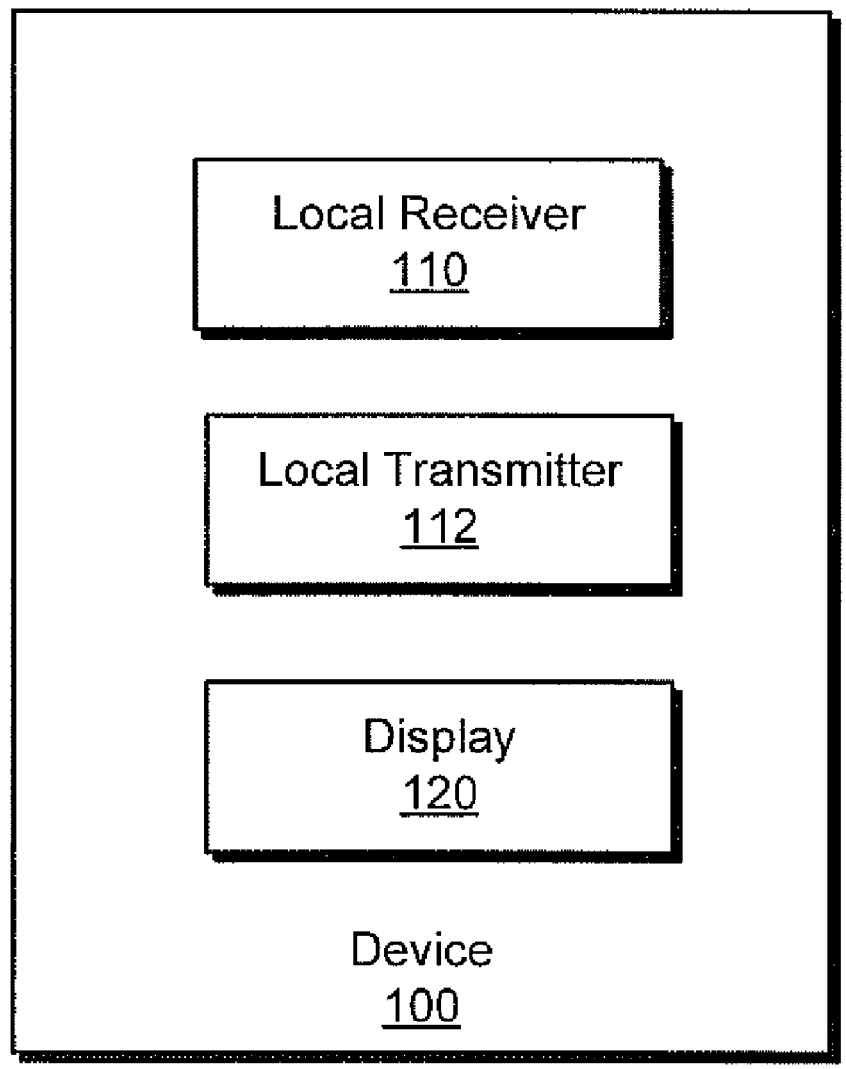
FIG. 4 is a block diagram of another embodiment of a device for quiet spot detection and transmission, in accordance with various embodiments of the present invention.

The user may be informed of the location of the quiet spot by any method suitable for the purpose. For example, as illustrated in FIG. 4, device 100 may include a display 120, which may display the frequency of the quiet spot. Display 120 may additionally or alternatively be configured to display status information such as, for example, information relating to whether device 100 is scanning a band to determine a quiet spot, storing an indication of a quiet spot, transmitting signals on the frequency of a quiet spot, or some combination thereof. In various embodiments, display 120 may be configured to display information related to the audio signals transmitted by device 100 such as, for example, information related to the music being played (song data, artist data, etc.), information related to the telephone conversation being held (telephone number, length of call, etc.), and so forth.

Device 100 may be configured to ensure that a frequency being used at any given time for transmitting audio signals to the remote receiver remains a quiet spot relative to other frequencies of the band. For these purposes, in various embodiments, device 100 may be configured to determine whether the set (or current) quiet spot is still a quiet spot by determining whether any change in the signal strength of the set quiet spot has occurred. Such changes in signal strength may occur, for example, in situations wherein device 100 is in transit (for example, while the user is driving) or over the course of time as broadcasting on the band may change.

In various embodiments, device 100 may be configured to periodically re-scan at least a portion of the frequency band to determine if any change in signal strength has occurred. In various embodiments, device 100 may be configured to compare the current signal strength against the stored signal strength of previously-scanned frequencies for possibly jumping to a quieter spot. For example, device 100 may re-evaluate the signal strength of a detected quiet spot and set it as the new quiet spot or keep jumping to another previously-detected quiet spot and so on until a quieter spot is found. In other embodiments, device 100 may be configured to simply determine whether the signal strength of the set quiet spot has changed rather than scanning multiple frequencies. If a change in the signal strength of the set quiet spot has occurred, device 100 may be configured to display a new quiet spot on display 120 and/or retune device 100 to transmit signals at another quiet spot.

Device 100 may be configured such that if device 100 is shut down and then re-started, device 100 may determine whether an indication of a location of a quiet spot is already stored on device 100 (such as, for example, on memory 118 as illustrated in FIG. 3). Accordingly, a user may avoid having to wait for device 100 to re-scan the radio band to find a quiet spot if the location of a quiet spot is already known.

According to various embodiments, if a location of a quiet spot is not already stored on device 100, device 100 may be configured to scan at least a portion of the radio band to locate one or more quiet spots. On the other hand, if an indication of a location of a quiet spot is already stored on device 100, device 100 may be configured to transmit signals at a frequency corresponding to the location of the quiet spot stored on device 100. If device 100 is not already tuned to transmit signals of the stored quiet spot frequency, device 100 may be configured to tune device 100 to transmit signals at the frequency of the stored quiet spot. In various embodiments, device 100 may be configured to display the frequency of the stored quiet spot on display 120.

Figure 5:
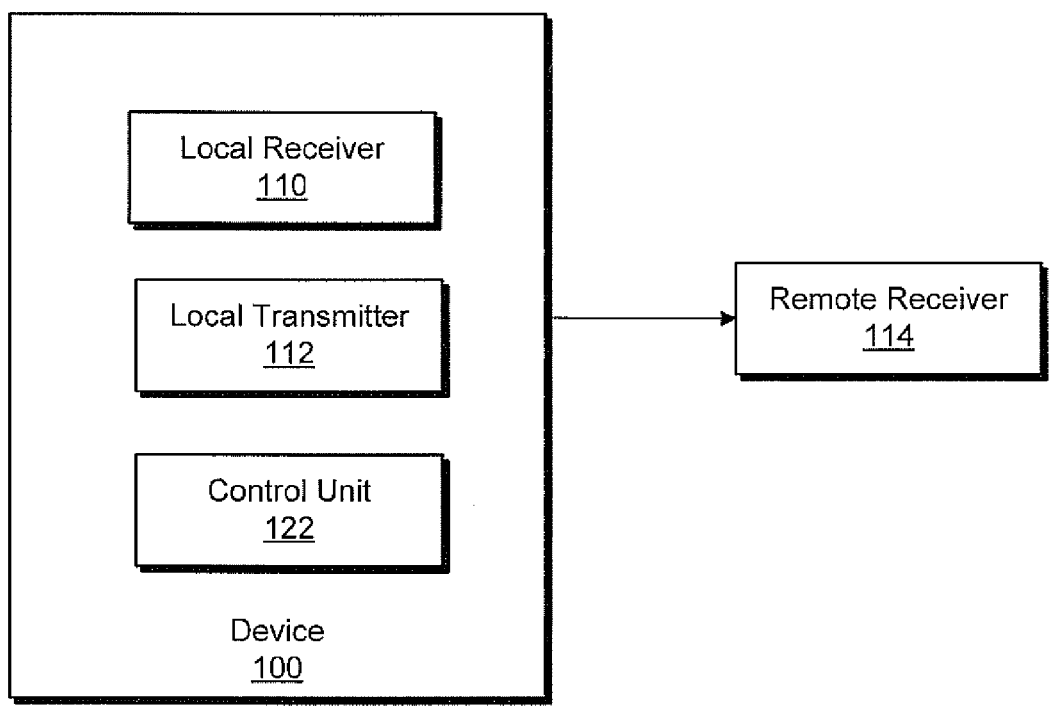
FIG. 5 is a block diagram of another system including another embodiment of a device for quiet spot detection and transmission, in accordance with various embodiments of the present invention.

As illustrated in FIG. 5, device 100 may include a control unit 122 configured to automatically tune remote receiver 114 to a frequency of a quiet spot. In some embodiments, control unit 122 may be configured to set remote receiver to the frequency of the quiet spot with no or little action required on the part of the user.

In various embodiments, control unit 122 may be configured to enlist the Radio Data System (RDS) standard (sometimes alternately referred to as Radio Broadcast Data System (RBDS) standard) for re-tuning remote receiver 114 to a different frequency.

In various embodiments, control unit 122 may communicate with, and re-tune, remote receiver 114 over one or more wired and/or wireless networks including, but not limited to, personal area networks, local area networks, wide area networks, metropolitan area networks, etc. Alternatively, control unit 122 may communicate with, and re-tune, remote receiver 114 over a wired connection such as, for example, a universal serial bus (USB) connection, FireWire™, or the like. The data transmission may be done in a manner compatible with any of a number of standards and/or specifications including, but not limited to, any one of the IEEE wireless standards, e.g., the 802.11-2007 standards along with any revisions, amendments, or updates thereto, Bluetooth™, Global System for Mobile Communications (GSM), code-division multiple access (CDMA), Ethernet, etc.

Although certain embodiments have been illustrated and described herein for purposes of description of the preferred embodiment, a wide variety of alternate and/or equivalent embodiments or implementations calculated to achieve the same purposes may be substituted for the embodiments shown and described without departing from the scope of the present invention. Embodiments in accordance with the present invention may be implemented in a very wide variety of ways. This application is intended to cover any adaptations or variations of the embodiments discussed herein.

The invention claimed is:

1. A chip comprising:
   a receiver configured to evaluate one or more frequencies of a frequency band to determine a quiet spot frequency; and
   a transmitter configured to transmit signals at the quiet spot frequency,
   wherein the receiver is further configured to
      evaluate the quiet spot frequency to determine if the quiet spot frequency has become non-quiet, and
      if the quiet spot frequency is determined to be non-quiet, re-evaluate the one or more frequencies to determine another quiet spot frequency,
   wherein based on the receiver determining the another quiet spot frequency, the transmitter is further configured to transmit signals at the another quiet spot frequency.

2. The chip of claim 1, further comprising memory, wherein the receiver is further configured to store an indicator of the quiet spot frequency in the memory.

3. The chip of claim 1, wherein the receiver is configured to determine the quiet spot frequency based at least in part on a signal strength of each of the one or more frequencies.

4. The chip of claim 3, wherein the quiet spot frequency has a signal strength lower than a signal strength corresponding to each of one or more other frequencies of the frequency band.

5. The chip of claim 4, further comprising a received signal strength indicator configured to determine the quiet spot frequency according to an IEEE 802.11 standard.

6. The chip of claim 1, wherein the receiver is configured to evaluate the quiet spot frequency upon powering up the device.

7. The chip of claim 1, further comprising a control unit configured to tune a remote sound producing arrangement to the quiet spot frequency.

8. The chip of claim 1, wherein the transmitter is configured to transmit the signals at the quiet spot frequency to a remote sound producing arrangement for demodulation of the signals.

9. A mobile device comprising the chip of claim 1.

10. The mobile device of claim 9, further comprising a display configured to display an indicator of the quiet spot.

11. A chip comprising:
   means for evaluating one or more frequencies of a frequency band to determine a quiet spot frequency;
   means for transmitting signals at the quiet spot frequency;

means for evaluating the quiet spot frequency to determine if the quiet spot frequency has become non-quiet; and means for re-evaluating the one or more frequencies to determine another quiet spot frequency, if the evaluated quiet spot frequency is determined to be non-quiet, wherein the means for transmitting signals is further configured to transmit signals at the another quiet spot frequency, based on the means for re-evaluating determining the another quiet spot frequency.

12. The chip of claim 11, wherein the means for evaluating the one or more frequencies comprises means for evaluating the one or more frequencies based at least in part on a signal strength of each of the one or more frequencies.

13. The chip of claim 12, wherein the quiet spot frequency has a signal strength lower than a signal strength of each of one or more other frequencies of the frequency band.

14. The chip of claim 11, further comprising means for storing an indicator of the quiet spot.

15. The chip of claim 11, further r comprising means to tune a remote sound producing arrangement to the quiet spot frequency.

16. The chip of claim 11, wherein the means for transmitting signals at the quiet spot frequency is configured to transmit the signals at the quiet spot frequency to a remote sound producing arrangement for demodulation of the signals.

17. A mobile device comprising the chip of claim 11.

18. The mobile device of claim 17, further comprising display means for displaying an indicator of the quiet spot.

\* \* \* \* \*